Oct. 4, 1932.   C. B. HASKINS   1,880,435
WEIGHING SCALE
Filed March 1, 1929
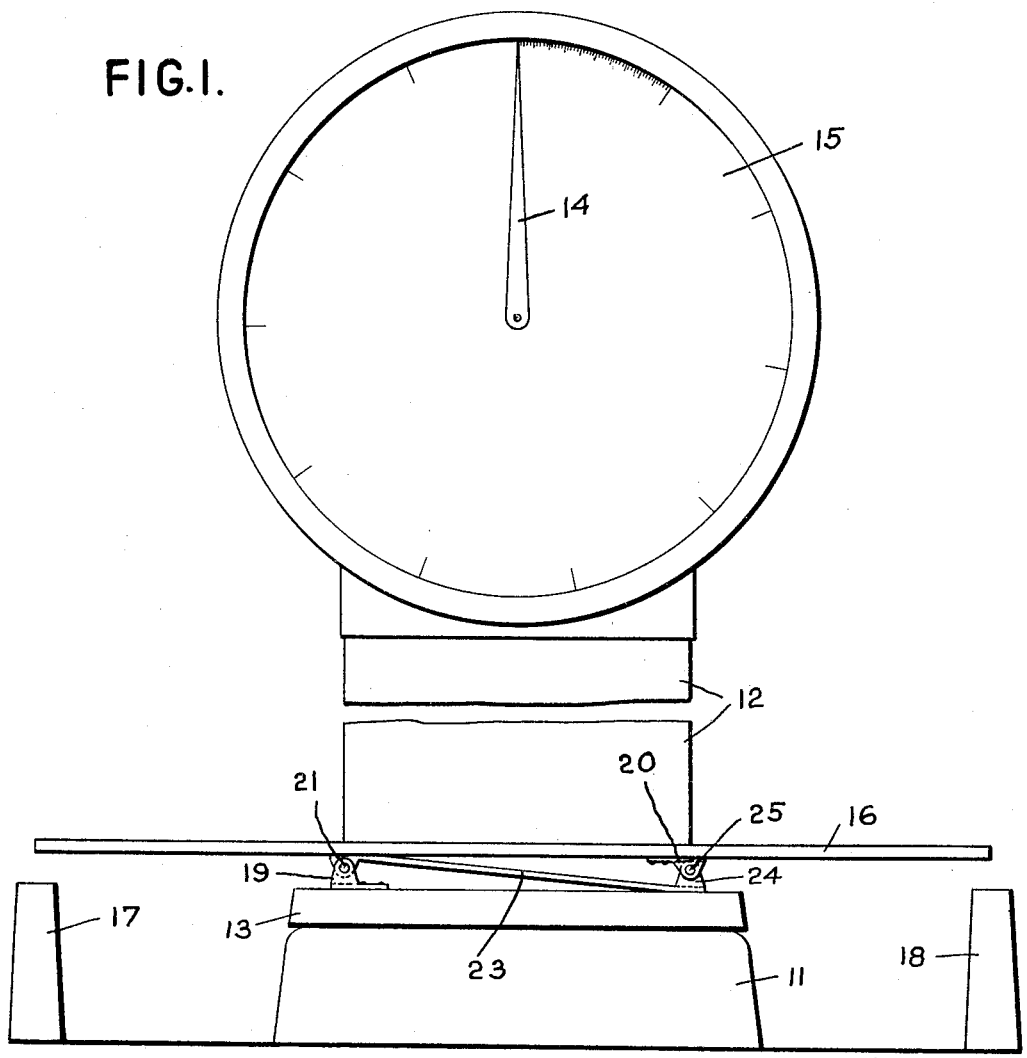
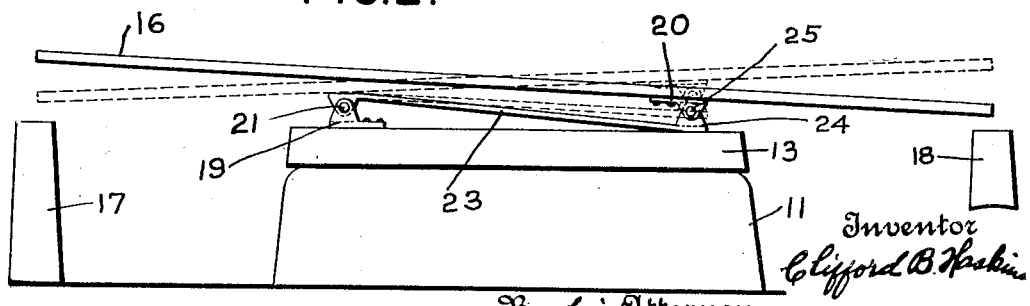

Patented Oct. 4, 1932

1,880,435

UNITED STATES PATENT OFFICE

CLIFFORD B. HASKINS, OF MAPLEWOOD, NEW JERSEY, ASSIGNOR TO DAYTON SCALE COMPANY, OF DAYTON, OHIO, A CORPORATION OF NEW JERSEY

WEIGHING SCALE

Application filed March 1, 1929. Serial No. 343,603.

The present invention relates to a load support for weighing scales and is particularly destined for heavy weight scales when articles longer than the platform such as beams or the like are to be weighed.

It is the main object of the present invention to provide a device which requires the operator to put the load in such a position upon the load support that the center of gravity of the load remains within a predetermined area of the support.

Another object of the invention is to provide means to tilt a supporting plate for the load and prevent weighing in case the load has not been put properly upon the support.

Other objects and advantages of the present invention will be obvious from the following specification and the accompanying drawing in which:

Fig. 1 shows schematically a weighing scale provided with the load support according to this invention, and Fig. 2 shows the same load support as Fig. 1 but in a different position.

In Fig. 1 the base housing of a scale is designated at 11 and the housing 12 which encloses the weight offset mechanism extends upwardly. This mechanism is under the control of the load support, and the indicator 14 is in turn under the control of the weight offset mechanism. The indicator shows on a chart 15 the load deposited upon the support when the parts are in equilibrium. The platform 13 of the scale is provided according to this invention with an auxiliary support 16 preferably in the form of a comparatively long plate. At a certain distance from the sides of base 11 there are provided beneath plate 16 posts 17 and 18. To the upper side of platform 13 is fast a bracket 19 and a similar bracket 20 is fast to the lower side of plate 16. In bracket 19 is pivoted a pin 21 fast to lips 22 of a connecting plate 23 and on the opposite end of said plate are provided lips 24 having a pin 25 which pivots in bracket 20.

As shown in Fig. 1 the right hand end of rod 23 rests upon platform 13 and on the left plate 16 rests upon the left end of plate 23 so that normally the auxiliary plate 16 is in horizontal position. When a standard scale is provided with the auxiliary support according to this invention, it will be understood that the indicator 14 is set upon its driving shaft in such a position that it is in zero position when the auxiliary support is attached to said scale.

If the operator puts a long article, say for instance a beam of wood or iron upon the support 16 in such a way that the center of gravity of said beam is within the pivots 21 and 25, the support 16 will stay in its horizontal position and the load will properly control the platform 13 and this in turn will control the weight offset mechanism. If, however, the load is improperly put upon support 16, as for instance if the load is very unequally deposited, the support 16 will tilt either to the right about pivot 20 as shown in Fig. 2 or to the left about pivot 21 depending upon which side there is an undue overload. It will be understood that the load must not necessarily be put in accurate center position but it is sufficient if the center of gravity of the load remains within pivots 21 and 25. As soon as the center of gravity is beyond these pivots the support 16 will tilt until its movement is stopped by posts 17 or 18 respectively.

This application shows a preferred embodiment of the invention which aims to secure a reliable action of an approximately equally distributed load upon the weighing mechanism and preventing tilting of the platform which is operatively connected with said weighing mechanism. It is, however, obvious that many variations and different constructions may be provided without departing from the spirit of the present invention and I want to be limited only by the scope of the following claims:

1. In a weighing mechanism, a platform operatively connected thereto, an auxiliary load support attached to said platform and mounted thereon so as to tilt relatively thereto on different fulcrums under the influence and depending upon an unequal distribution of a load upon said auxiliary support.

2. In a weighing mechanism, a platform operatively connected thereto, an auxiliary load support, means supporting and attaching said auxiliary support above and parallelly to said platform, said means including a plurality of fulcrums about which the support is tiltable under the control of a load unequally deposited upon said auxiliary support.

3. In a weighing scale, a platform, an auxiliary load support, a bracket on said platform and a bracket on said auxiliary support opposite the bracket on said platform and a connecting rod pivotally mounted on its ends to said brackets.

4. In a weighing scale, a platform, an auxiliary load support, a bracket on said platform mounted in proximity to the edge of said platform and a bracket on said auxiliary support in proximity to the opposite edge of said platform and a connecting rod pivotally mounted on its ends to said brackets.

5. A weighing scale as described in the preceding claim wherein said brackets are mounted on sides of said platform and auxiliary support respectively facing each other.

6. In a weighing scale, a platform, an auxiliary load support extending beyond said platform, a bracket on said platform mounted in proximity to the edge of said platform and a bracket on said auxiliary support in proximity to the opposite edge of said platform, said brackets being mounted on facing sides of said platform and auxiliary support respectively and a connecting rod pivotally mounted on its ends to said brackets, said auxiliary rod resting upon the end of said rod which is pivoted to the bracket fast to the platform and the opposite end of said rod resting upon the platform.

7. In combination, a weighing mechanism, a load support controlling said weighing mechanism, means for mounting said support to tilt in any of a plurality of directions when the center of gravity of the deposited load is beyond a predetermined area of said support and means to limit the tilting movement of said support.

8. In combination, a weighing mechanism, a platform controlling said weighing mechanism, an auxiliary support attached to said platform and having a portion extending beyond an end of the platform, means for mounting said support on the platform to adapt the support to tilt when the center of gravity of the load deposited upon said auxiliary support is within aforesaid portion of said auxiliary support and means to limit the movement of said auxiliary support when tilting.

9. A device according to claim 8 wherein said means for limiting the tilting movement of said auxiliary support comprise a plurality of posts arranged in the paths of tilting of said auxiliary support.

10. In a weighing scale, weighing mechanism, a support for the load connected to the weighing mechanism, and means for mounting said support to prevent its holding a load in weighing position when the center of gravity of the load is to either side of a predetermined portion of the support.

11. In a weighing scale, weighing mechanism, a load support connected thereto and having an equilibrium position, and means for mounting said support to adapt it to be overbalanced in any of several directions from its equilibrium position.

12. In a weighing scale, weighing mechanism, a load support connected thereto, and means for mounting said support to enable it to automatically tilt towards the center of gravity of the load in the support when the center of gravity of the load is located to either side of a predetermined portion of the support.

13. In a weighing scale, weighing mechanism, a load support connected thereto and having an equilibrium position, means for mounting said support to adapt it to tilt to either side of its equilibrium position, and means for limiting said movement of the support to either side of the equilibrium position.

14. In a weighing scale, weighing mechanism, a load support, a carrier for the support connected to the weighing mechanism, and a member independent of weighing mechanism, the support being movably mounted to be normally entirely carried by said carrier and to be movable for resting on aforesaid member when the center of gravity of the load is not within a predetermined part of the support.

15. In a weighing scale, weighing mechanism, a load support cooperatively associated therewith, a carrier for said support, and a plurality of shafts interposed between the top of the carrier and the bottom of said support on each of which shafts the support is tiltable.

16. In a weighing scale, a load support, weighing mechanism associated therewith, a carrier for said support, means for connecting the support to the carrier, the support extending beyond two sides of said carrier and mounted on the connecting means for movement to either of these sides.

17. In a weighing scale, a load support, weighing mechanism associated therewith, a carrier for the support, and means including a plurality of parallel pivots connecting the support and carrier, the pivots being adjacent opposite parallel sides of the support and the latter being tiltable about either of said pivots.

18. In a weighing scale, weighing mechanism, a load support associated therewith, a carrier for the support, and a link pivoted to both the support and carrier for connecting the two.

In testimony whereof I hereto affix my signature.

CLIFFORD B. HASKINS.